Figure 1:
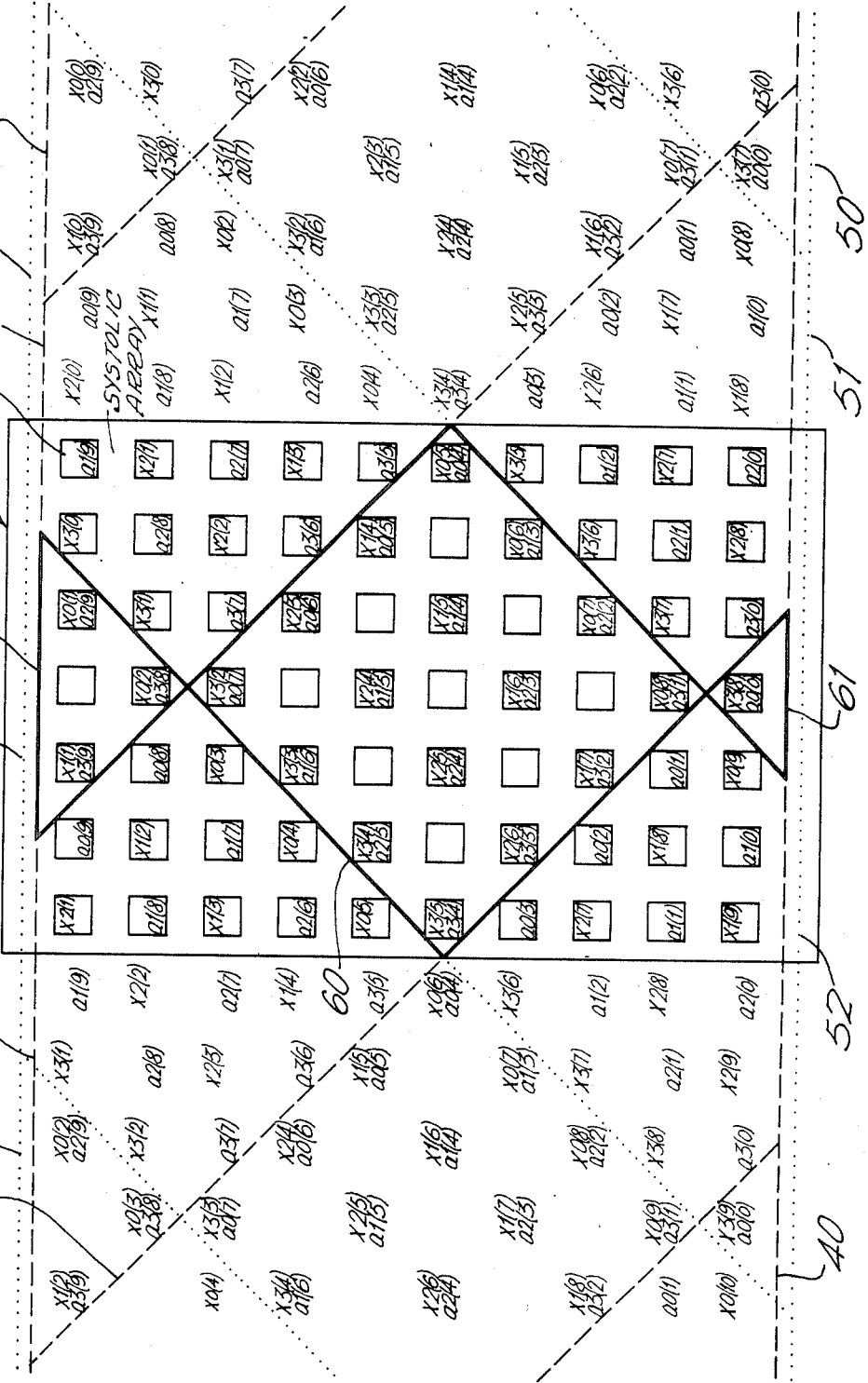

United States Patent [19]

McCanny et al.

[11] Patent Number: 4,701,876

[45] Date of Patent: Oct. 20, 1987

[54] DIGITAL DATA PROCESSOR FOR MULTIPLYING DATA BY A COEFFICIENT SET

[75] Inventors: John V. McCanny, Belfast, Northern Ireland; John G. McWhirter, Malvern; Kenneth W. Wood, Newcastle-upon-Tyne, both of England

[73] Assignee: National Research Development Corporation, London, England

[21] Appl. No.: 651,312

[22] Filed: Sep. 17, 1984

[30] Foreign Application Priority Data

Oct. 5, 1983 [GB] United Kingdom ................ 8326690

[51] Int. Cl.$^4$ ................ G06F 15/336; G06F 15/347
[52] U.S. Cl. ................................... 364/728; 364/754
[58] Field of Search ............ 364/728, 736, 754, 749, 364/758, 759, 200 MS File

[56] References Cited

U.S. PATENT DOCUMENTS

| 4,363,107 | 12/1982 | Ohhashi et al. | 364/758 |
| 4,369,500 | 1/1983 | Fette | 364/758 |
| 4,493,048 | 1/1985 | Kung et al. | 364/754 |
| 4,546,445 | 10/1985 | Haugen | 364/728 |

FOREIGN PATENT DOCUMENTS 2106287A  4/1983  United Kingdom ................ 364/758

OTHER PUBLICATIONS

Kung, "Why Systolic Architectures?", *Computer*, Jan. 1982, pp. 37-45.
McCanny et al, "Bit-Level Systolic Array Circuit for Matrix Vector Multiplication", *IEE Proceedings*, vol. 130, Pt. G, No. 4, Aug. '83, pp. 125-130.
Foster et al, "The Design of Special-Purpose VLSI Chips", *Computer*, Jan. 1980, pp. 26-40.
Thompson, "Digital Arithmetic Units for a High Data Rate", *The Radio and Electronic Engineer*, vol. 45, No. 3, Mar. 1975, pp. 116-120.
Hallin et al, "Pipelining of Arithmetic Functions", *IEEE Trans. on Computers*, Aug. 1972, pp. 880-886.

*Primary Examiner*—David H. Malzahn
*Attorney, Agent, or Firm*—Cushman, Darby & Cushman

[57] ABSTRACT

A digital data processor is provided to multiply data elements by coefficients. It includes a systolic array of cells consisting of nearest neighbor connected gated full adders. The cells multiply data bits received from laterally adjacent cells and subsequently pass them on. The product is added to a cumulative sum bit from a cell above and to a carry bit recirculated from an earlier computation. The output is passed to a cell below, and a new carry bit is recirculated for addition in a subsequent computation. Data and coefficients are input in counterflow to opposite sides of the array. An adder tree accumulates non-simultaneously computed contributions to individual output terms. The tree incorporates a delay and switches arranged to implement or bypass the delay according to earlier or later computation of a contribution. By virtue of this accumulation, the processor provides reduced cell redundancy compared to the prior art.

8 Claims, 19 Drawing Figures $s \leftarrow s' \oplus (a.x) \oplus c'$
$c \leftarrow (a.x).s' + (a.x).c' + s'.c'$ $s \leftarrow s' \oplus (ctrl \oplus a.x) \oplus c'$
$c \leftarrow (ctrl \oplus a.x).s' + (ctrl \oplus a.x).c' + s'.c'$

Fig.16.

| 213 | 212 | 211 | 210 | 220 | 215 | 216 | 217 |
|---|---|---|---|---|---|---|---|
| x(3) | x(2) | x(1) | x(0) | | a(9) | a(9) | a(9) |
| x(4) | x(3) | x(2) | x(1) | | a(8) | a(8) | a(8) |
| x(5) | x(4) | x(3) | x(2) | | a(7) | a(7) | a(7) |
| x(6) | x(5) | x(4) | x(3) | | a(6) | a(6) | a(6) |
| | x(6) | x(5) | x(4) | | a(5) | a(5) | a(5) |
| | x(7) | x(6) | x(5) | | a(4) | a(4) | |
| | x(8) | x(7) | x(6) | | a(3) | a(3) | |
| | x(9) | x(8) | x(7) | | a(2) | a(2) | |
| | x(10) | x(9) | x(8) | | a(1) | a(1) | |
| | x(11) | x(10) | x(9) | | a(0) | a(0) | |

214 →      ← 219

221

Fig. 17.

| 213' | 212' | 211' | 210' | 220' | 215' | 216' | 217' |
|------|------|------|------|------|------|------|------|
| x(3) | x(2) | x(1) | x(0) |      | a(0) | a(0) | a(0) |
| x(4) | x(3) | x(2) | x(1) |      | a(1) | a(1) | a(1) |
| x(5) | x(4) | x(3) | x(2) |      | a(2) | a(2) | a(2) |
| x(6) | x(5) | x(4) | x(3) |      | a(3) | a(3) | a(3) |
|      | x(6) | x(5) | x(4) |      | a(4) | a(4) | a(4) |
|      | x(7) | x(6) | x(5) |      | a(5) | a(5) |      |
|      | x(8) | x(7) | x(6) |      | a(6) | a(6) |      |
|      | x(9) | x(8) | x(7) |      | a(7) | a(7) |      |
|      | x(10)| x(9) | x(8) |      | a(8) | a(8) |      |
|      | x(11)| x(10)| x(9) |      | a(9) | a(9) |      |

214' → (left side), ← 214' (right side)

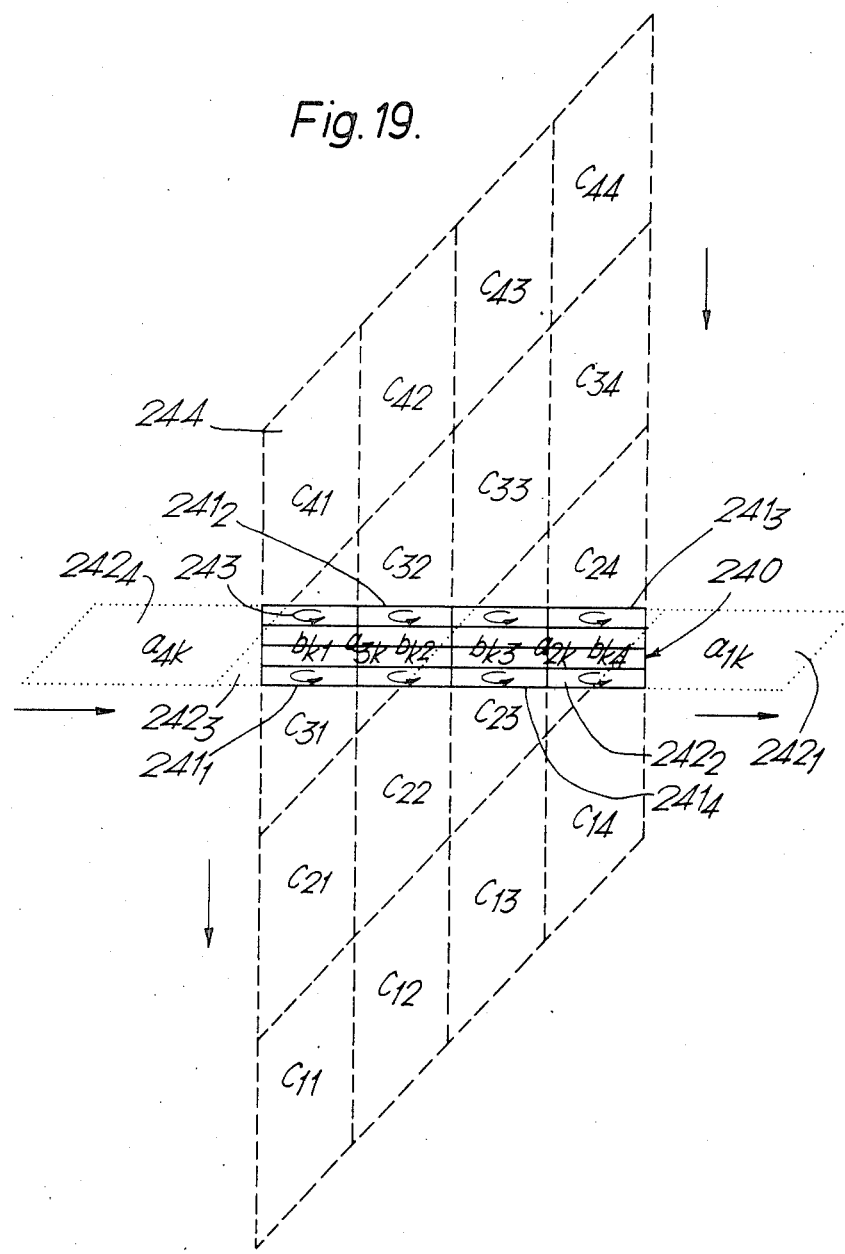

DIGITAL DATA PROCESSOR FOR MULTIPLYING DATA BY A COEFFICIENT SET

This invention relates to a digital data processor of the kind incorporating a systolic array of pipelined bit-level processing cells.

Systolic arrays of pipelined bit-level processing cells are known, as set out for example is published United Kingdom Patent Application No. GB 2106 287 A (corresponds to U.S. Pat. No. 4,639,857). This form of array consists of nearest-neighbour connected processing cells for which the only external control required is a clock. A computer programme is not required, since array operation is prescribed by cell function, cell interconnection and data propagation. Systolic arrays are well suited to pipelined operations and parallel processing which can reduce the number of idle devices awaiting data undergoing processing elsewhere. A sequence of operations is said to be pipelined if a data element may enter the sequence before the preceding element has left it.

Prior art Application No. GB 2106 287 A describes systolic array processors for multiplying (1) two numbers, (2) a number and a vector, (3) two vectors, (4) a vector and a matrix. In addition, convolution and correlation of data with a set of coefficients is described. Each cell of these prior art arrays is a bit-level gated full adder arranged to multiply together two input data bits received from respective lateral nearest neighbour cells, to add the product to a cumulative sum bit from an upper nearest neighbour cell and a carry bit from a lower order bit computation, to output the result to a lower nearest neighbour cell and to generate a new carry bit. Data bits previously input from left and right hand neighbouring cells are passed on to right and left hand neighbours respectively. Carry bits propagate to the left. Data elements and coefficients are input bit-serially to both sides of an array and form two data streams moving through each other to the left and to the right respectively, individual bit-level interactions taking place at cell sites. Accumulating means are provided to accumulate bit-level product terms computed by processing cells and corresponding to different elements in a result.

It is a disadvantage to the use of the prior art array that it incorporates cell redundancy; i.e. an appreciable number of processing cells do not contribute to the computed result at any given instant. Those cells which are redundant change from clock cycle to clock cycle as input data streams mutually counter-propagate through the array, but overall there is a significant number of cells surplus to the relevant computation at any given time.

It is an object of the present invention to provide a digital data processor having reduced cell redundancy as compared to the prior art.

The present invention provides a digital data processor for carrying out a multiplication operation involving a stream of data words and a set of coefficient words to form output terms each consisting of a sum of data/coefficient products, the processor including:

(1) a systolic array of bit-level processing cells each arranged for bit-level multiplication, (2) input means to produce interaction between bit-serial data elements and coefficients in the array, (3) accumulating means for summing non-simultaneously computed contributions to individual bits of output terms, and (4) clocking means to control operation of the processing cells, input means and accumulating means.

It has been found that a processor of the invention can provide reduced cell redundancy as compared to the prior art.

In a preferred embodiment, data elements and coefficients are input bit-serially, least significant bit leading, with each coefficient passing repetitively through a respective row of the array.

The data element and coefficient word lengths are preferably extended with zero bits to half the maximum word length of output terms in order to accommodate output word growth.

The input means may be arranged to input data and coefficient words with zero bits interspersed between adjacent bits and adjacent words. The clocking means is then arranged to advance each word one cell along a respective row of the array after each processing cycle, and a cumulative time stagger or delay is applied between input of successive data elements and coefficient words to adjacent rows.

In a preferred embodiment however, the input means is arranged for word input without interspersed zero bits. The clocking means is then arranged to advance both data elements and coefficients in adjacent rows on alternate processing cycles such that each advanced data element or coefficient interacts with a respective stationary coefficient or data element. Data elements in alternate rows are input with a cumulative time stagger therebetween, and are advanced on alternate cycles to establish time staggers over data elements in each respective adjacent row. Each adjacent row is advanced on each subsequent cycle to remove the stagger established by a respective neighbouring row. Similar input arrangements apply in antiphase to coefficients.

The processing cells may conveniently be nearest neighbour connected gated full adders arranged to generate the product of two data coefficient bits input from first and second neighbouring cells, add the product to a cumulative sum bit received from a third neighbouring cell and to a carry bit from a lower order bit computation, output a result to a fourth neighbouring cell, pass on the data coefficient bits to the second and first neighbouring cells respectively, and generate a new carry bit for addition to a higher order bit computation one cycle later. The carry bit is preferably recirculated for addition by the same cell in a later computation.

The accumulating means may be a full adder tree incorporating delaying means such as a shift register to realign in time non-simultaneously computed contributions to individual bits of output terms. The accumulating means may also include switching means arranged to implement or bypass the delaying means during passage of earlier or later computed contributions respectively.

The data input means may conveniently be arranged to cycle each coefficient repetitively through a respective row of the array via a feedback line incorporating delaying means ensuring sequential word input.

In one embodiment, the processor of the invention is arranged to perform convolution or correlation of data elements with coefficients. The data input means then includes feed lines to transfer data output from each row of the array for input to a respective adjacent row, the feed lines incorporating delaying means to ensure sequential word input.

In a second embodiment, the processor of the invention is arranged to multiply a matrix by a vector, the data elements and coefficients correspond to matrix and vector elements respectively. In this embodiment, the input means is arranged to pass each row of the matrix through a respective row of the array.

In a third embodiment, the processor of the invention is arranged to generate a matrix-matrix product. This processor incorporates a cascaded array of matrix-vector sub-arrays each in accordance with the second embodiment. One of the matrices is treated as being equivalent to a set of vectors, each matrix row being associated with a respective sub-array and each row element recirculating through a respective sub-array row. The other matrix is input with matrix rows passing through respective sub-array rows sequentially.

The processor of the invention may be implemented as a single integrated circuit cascadable both in one dimension to increase the number of coefficients or matrix elements accommodated, and in a second dimension to accommodate increased input word lengths and/or matrix-matrix multiplication. The integrated circuit may incorporate programmable switching means to adapt it for different modes of operation, such as coefficient loading, convolution computation and matrix-vector multiplication.

Figure 2:
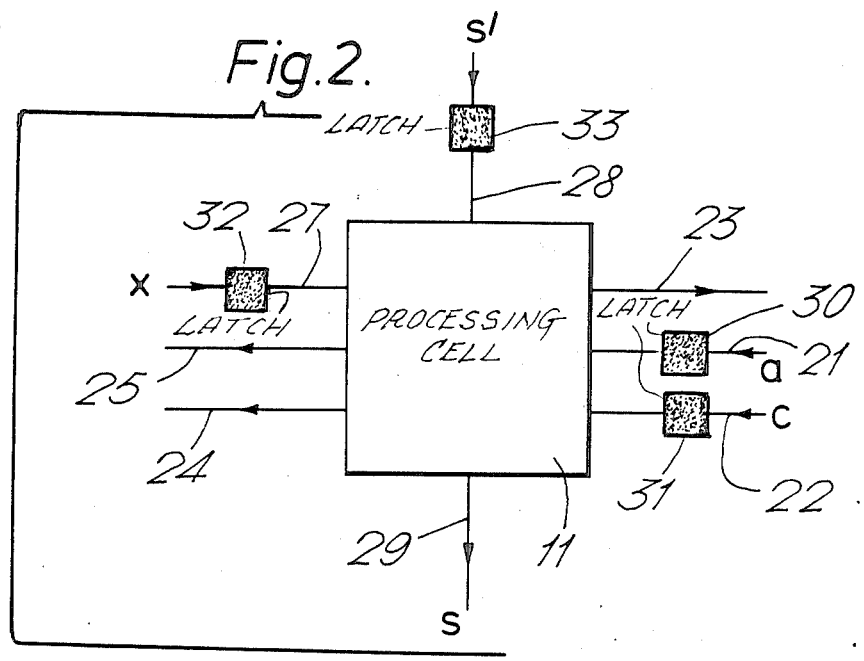
Figure 13:
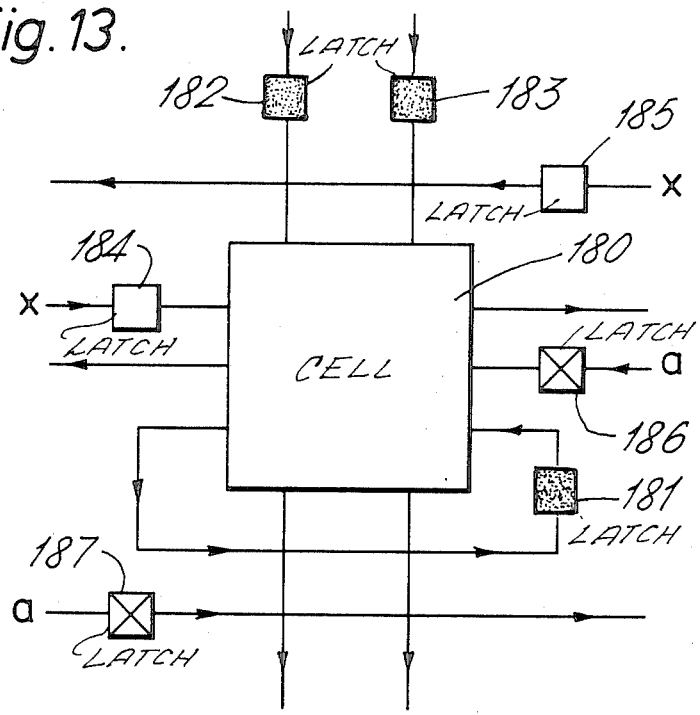
Figure 3:
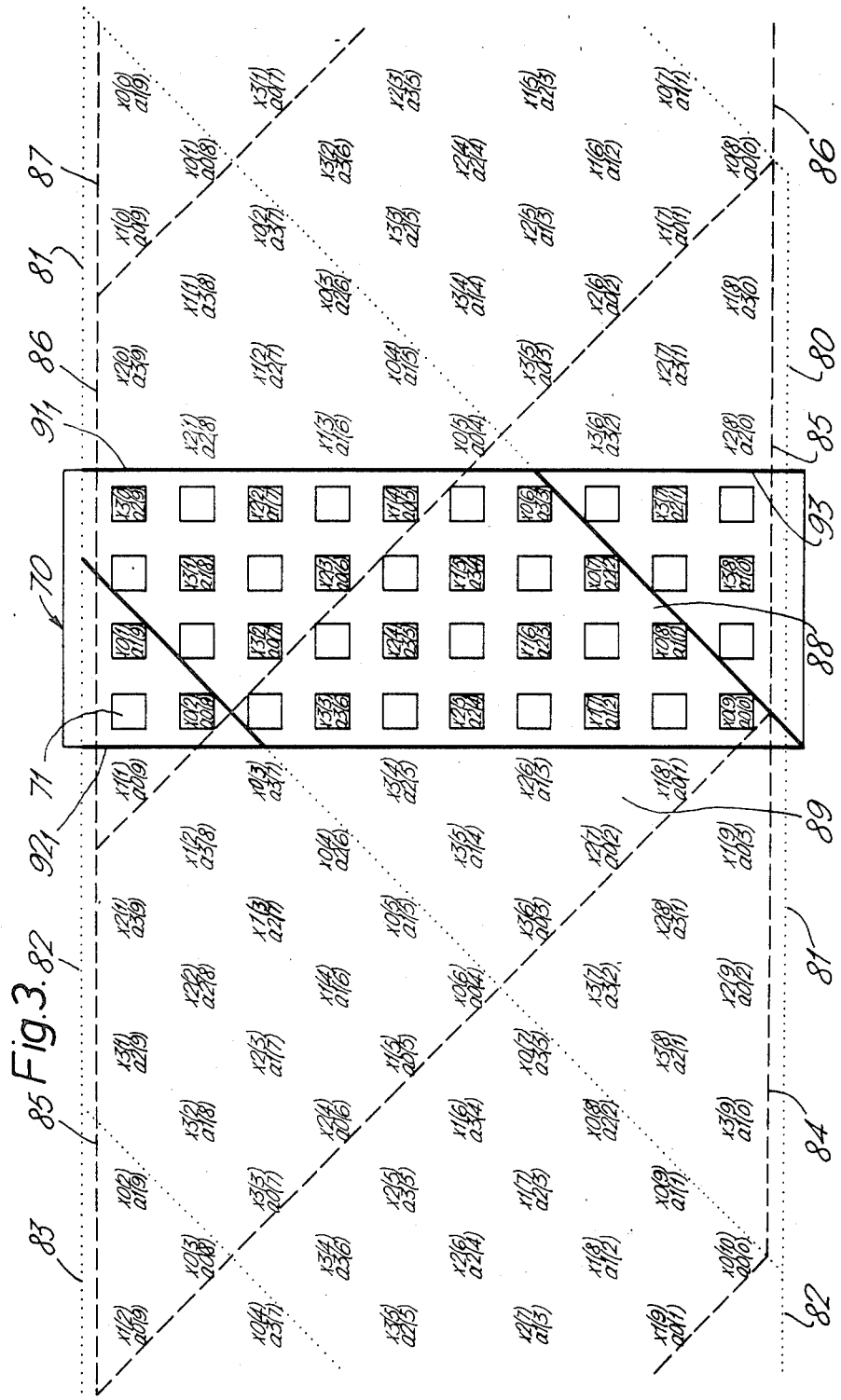
Figure 4:
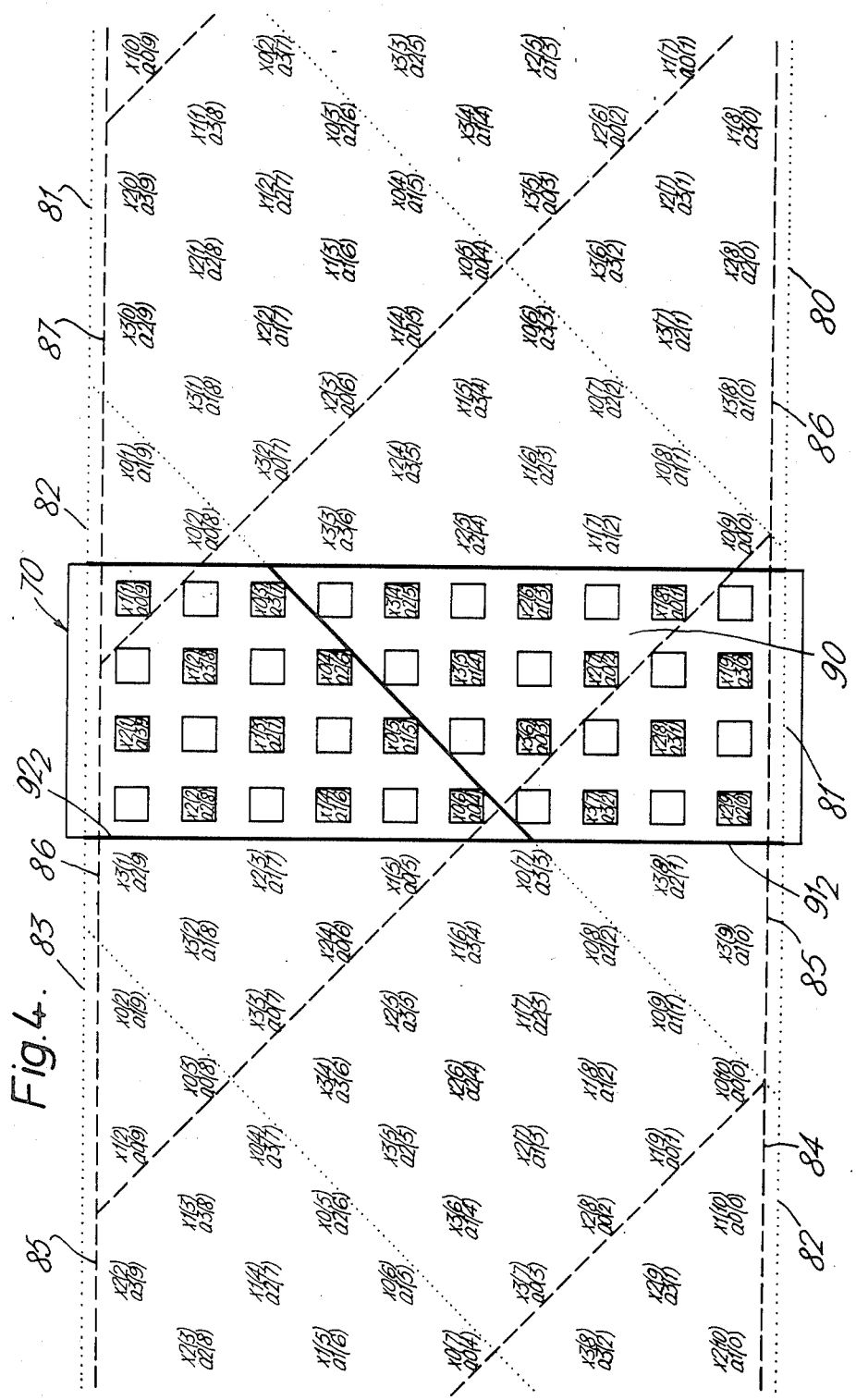
Figure 5:
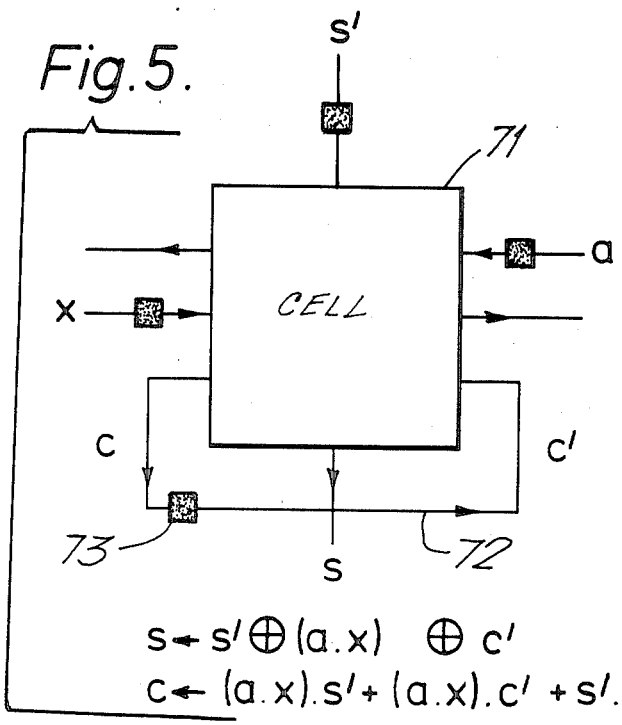
Figure 6:
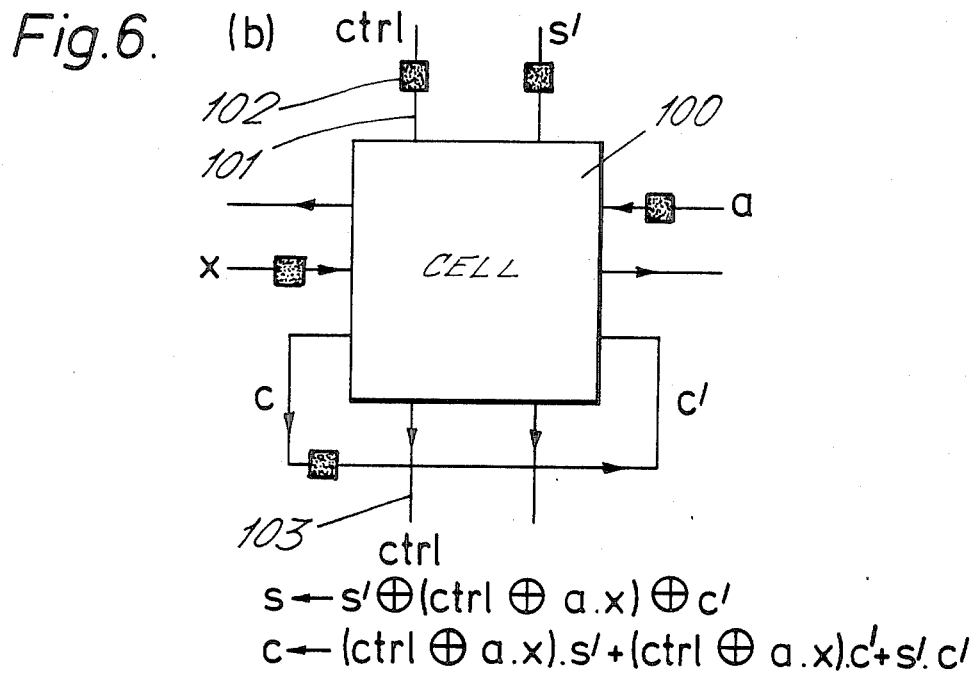
Figure 7:
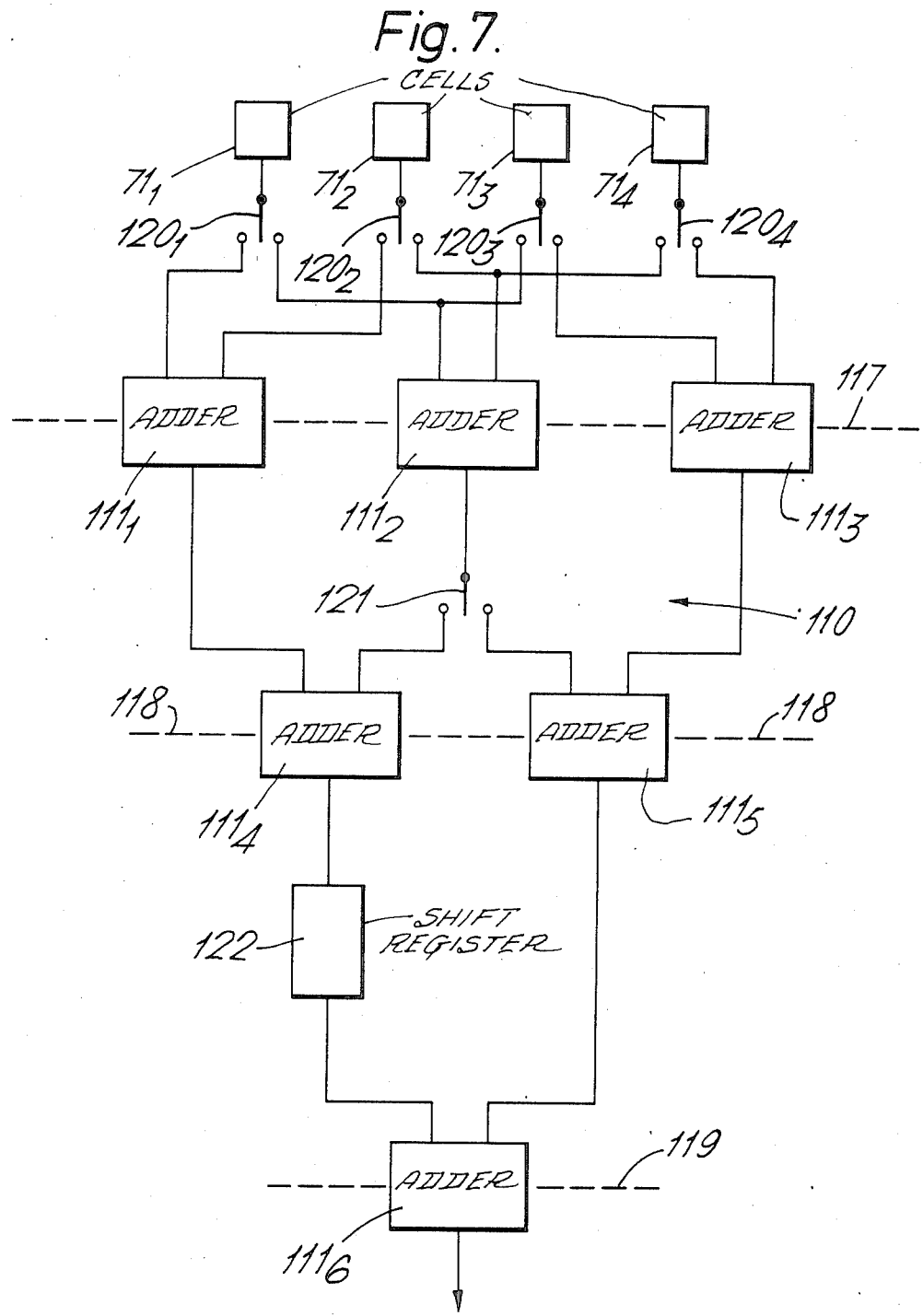
Figure 8:
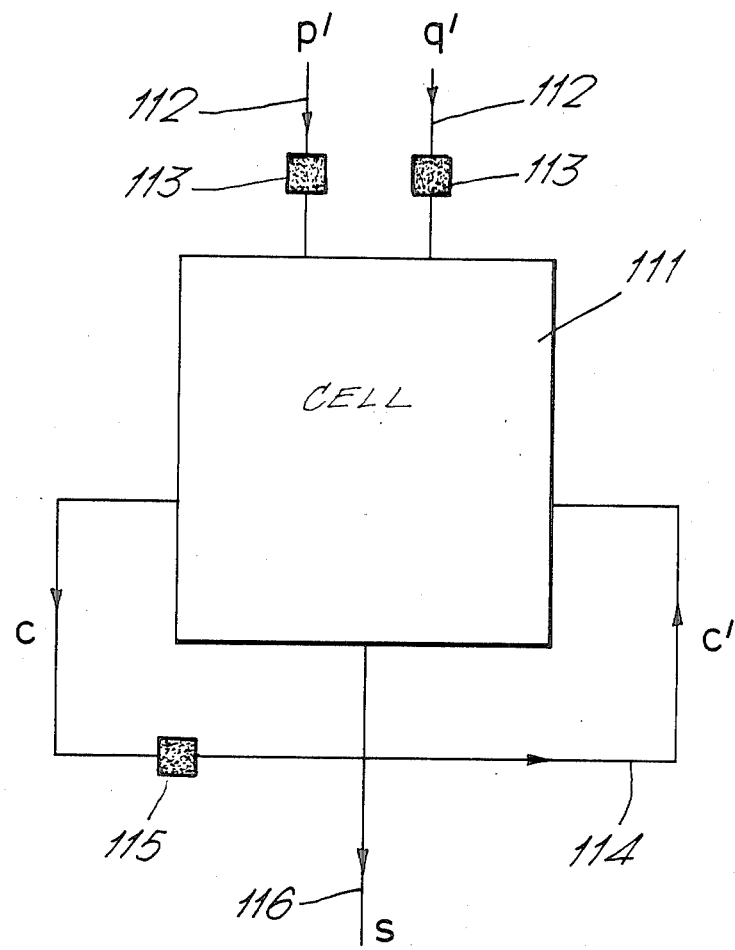
Figure 9:
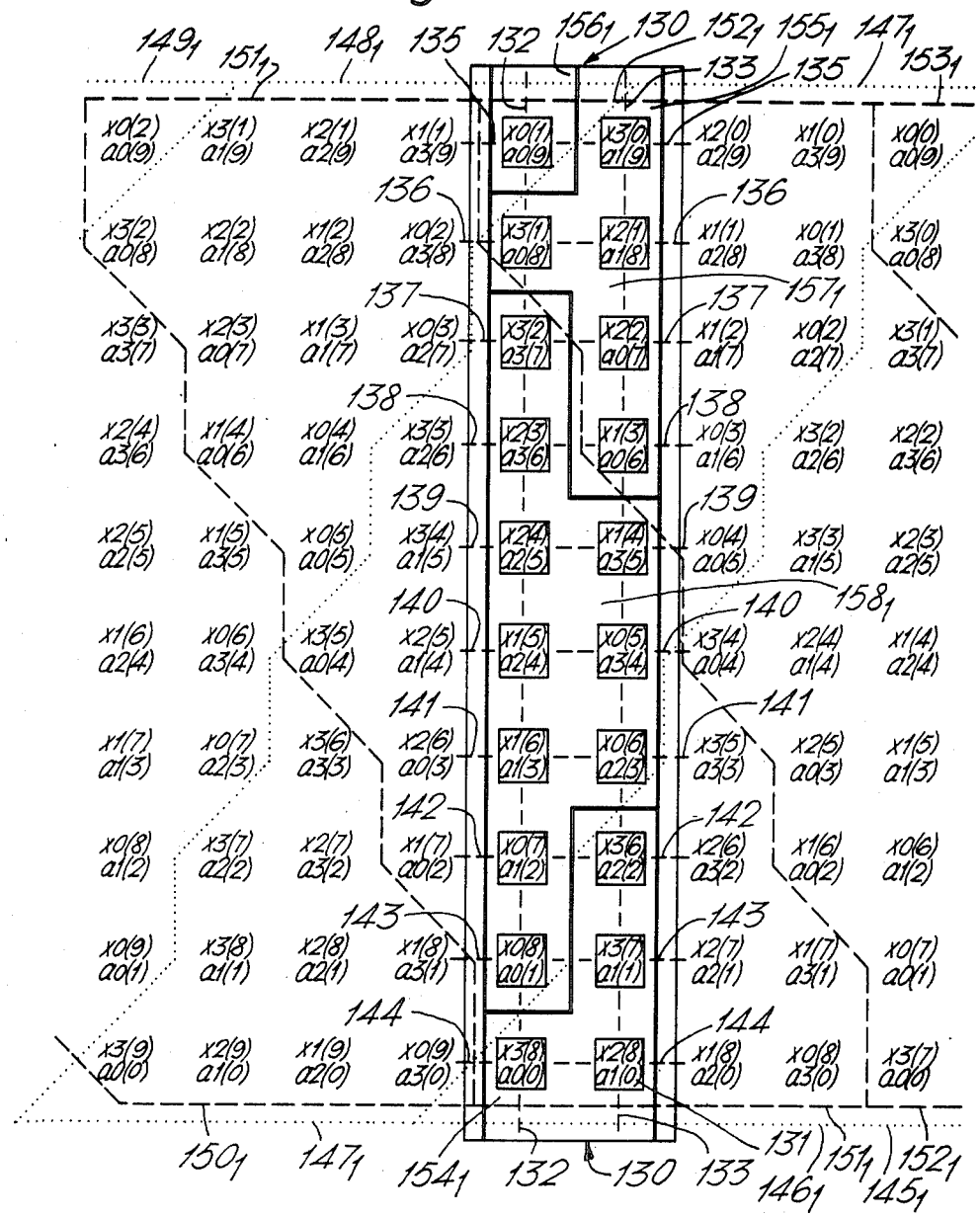
Figure 10:
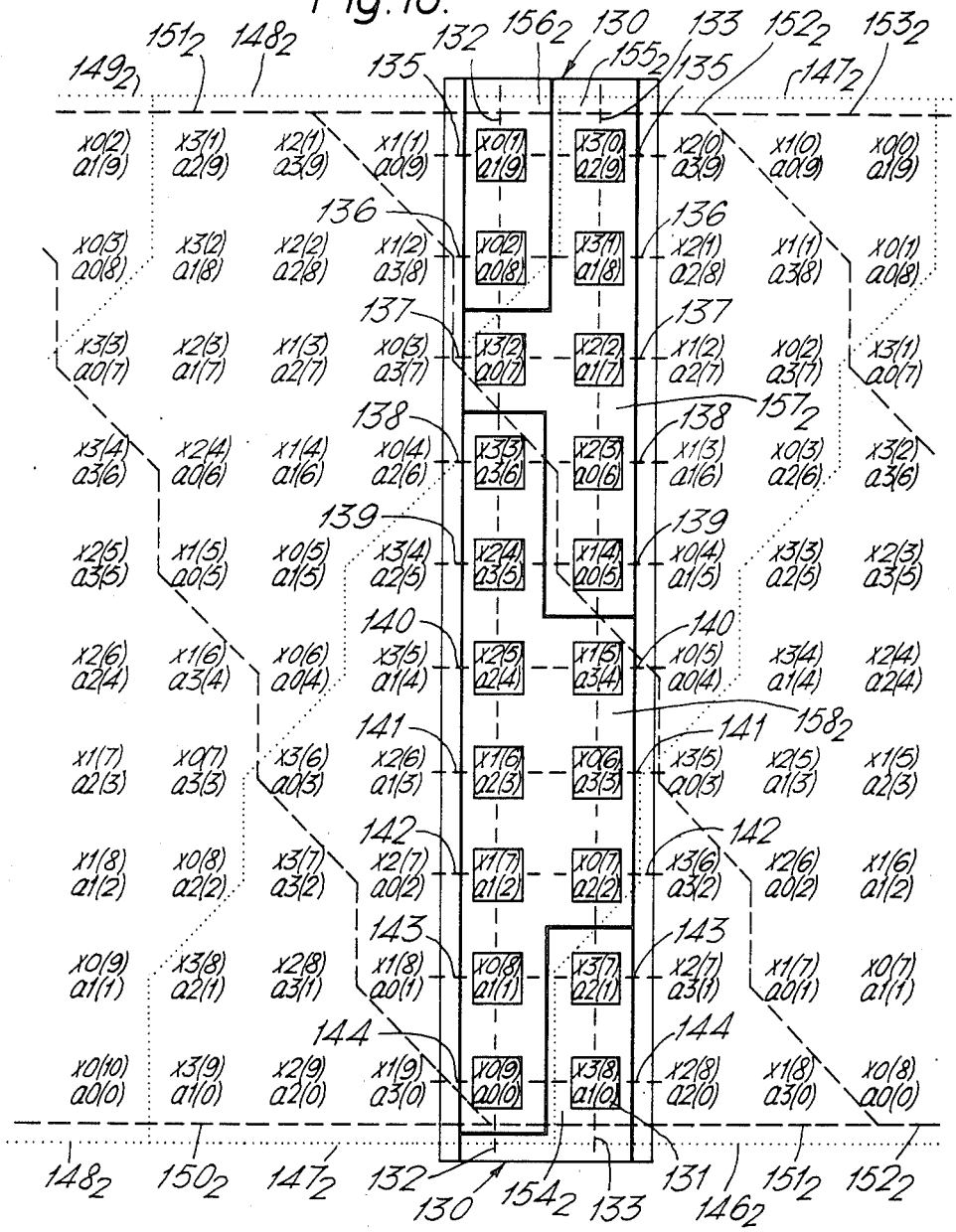
Figure 11:
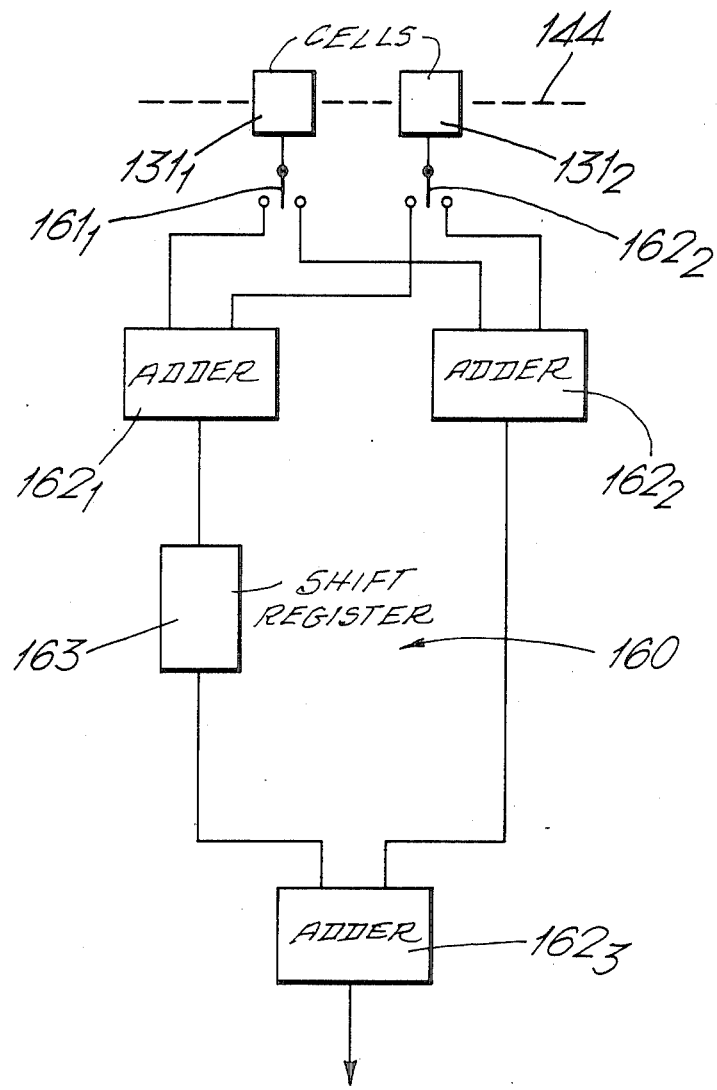
Figure 12:
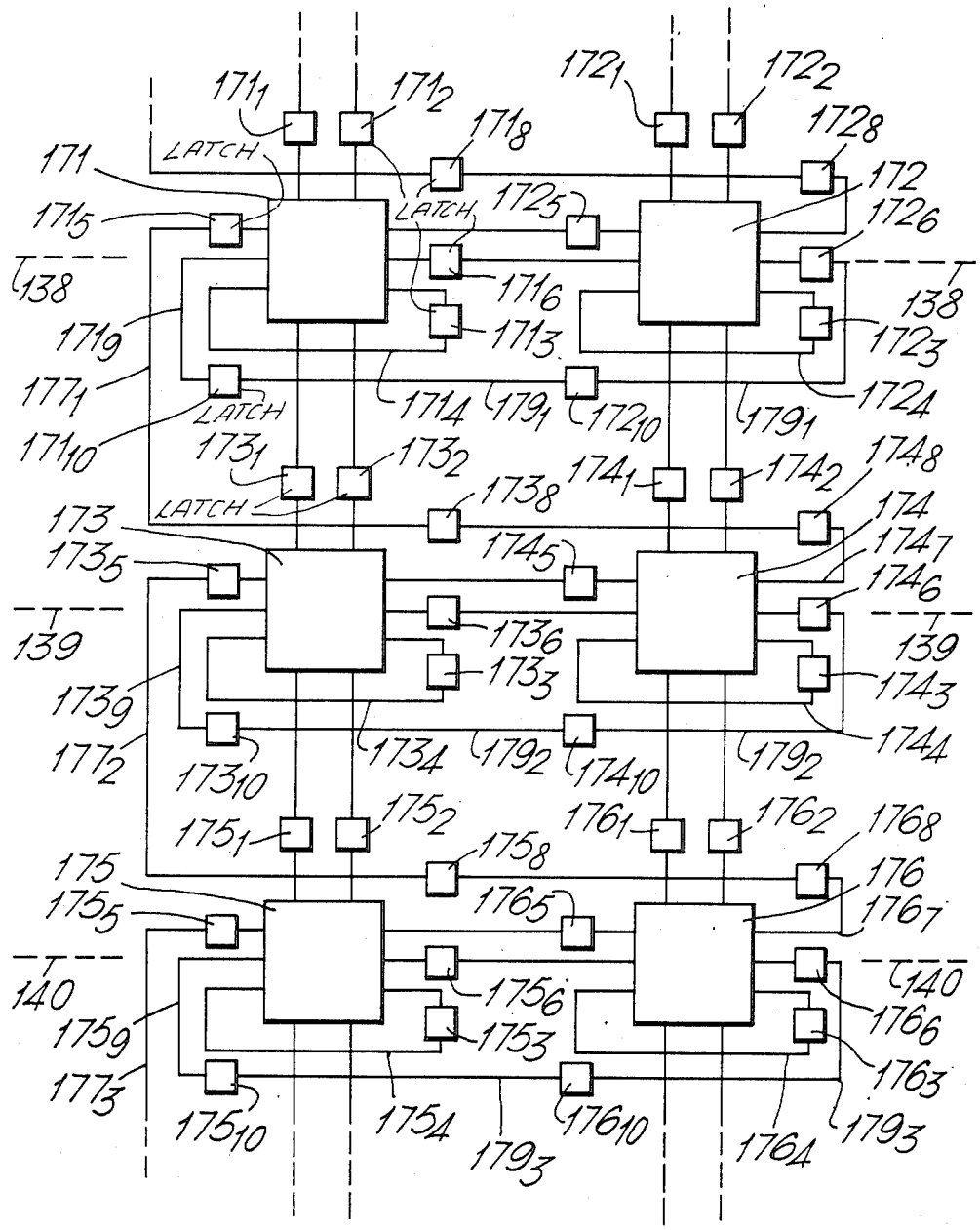
Figure 14:
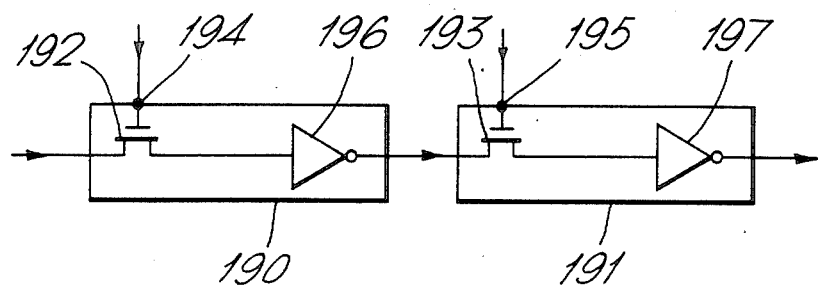
Figure 15:
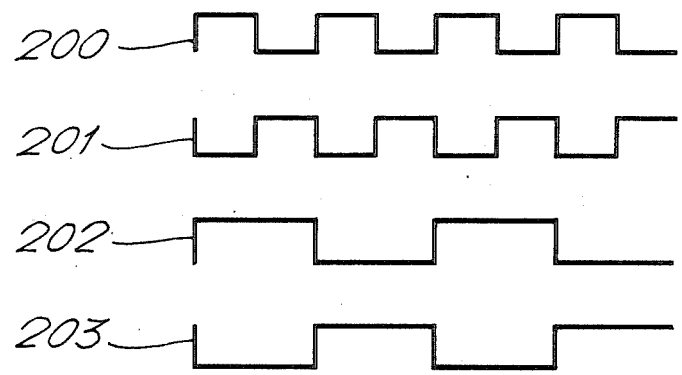

In order that the invention might be more fully understood, examples thereof will now be described by way of example only, with reference to the accompanying drawings, in which:

FIG. 1 is a schematic drawing of a prior art array of processing cells implementing a digital convolver, FIG. 2 is a schematic drawing of a gated full adder cell as incorporated in the FIG. 1 array, FIGS. 3 and 4 are schematic drawings of a processor of the invention for performing a convolution, and illustrate the seventy-third and seventy-seventh cycles of operation respectively, FIGS. 5 and 6 illustrate gated full adder cells for processing all positive and twos complement numbers respectively in a processor of the invention, FIG. 7 illustrates an accumulator for accumulating bit-level products in the FIG. 3 or 4 processor of the invention, FIG. 8 is a drawing of a full adder cell for the FIG. 7 accumulator, FIGS. 9 and 10 are schematic drawings of a further processor of the invention during successive processing cycles, FIG. 11 illustrates an accumulator for the processor of FIGS. 9 and 10, FIG. 12 illustrates in more detail three rows of the processor shown in FIGS. 9 and 10, FIG. 13 illustrates a processing cell incorporated in FIGS. 9, 10 and 12, FIG. 14 illustrates a latch incorporated in the FIG. 13 cell, FIG. 15 illustrates clock waveforms for the FIG. 14 latch, and FIGS. 16, 17, 18 and 19 show respectively schematic word level representation of a convolver, a correlator, a matrix-vector multiplier and a matrix-matrix multiplier in accordance with the invention.

Referring to FIG. 1, there is shown a prior art systolic array indicated by a rectangle 10. The array 10 comprises individual bit-level processing cells indicated by squares such as 11 with nearest neighbour cell interconnections (not shown). The array 10 is arranged to carry out an N-point convolution of a set of coefficients a(i) with an input data stream of variables x(n−i) to form successive products y(n) given by:

$$y(n) = \sum_{i=0}^{N-1} a(i)x(n-i), n = 0, 1, 2, \ldots \quad (1)$$

where coefficients a(i) and data words x(n−i) each have four bits. Bit significance is indicated in FIG. 1 by an integer p=0, 1, 2 or 3, in ap(i) or xp(n−i) in ascending order of significance, i.e. p=0 indicates a least significant bit (lsb).

FIG. 1 is similar to FIG. 15 of published United Kingdom Patent Application No. GB 2106 287 A, which relates to a ten-point convolution of three-bit coefficients and data words.

The array 10 is illustrated at a single instant of time during processing of data and coefficients to produce convolution products. It has ten rows of cells 11, one row for each point of the convolution, and seven columns, the prior art array 10 requiring (2m−1) columns for data words and convolution coefficients m bits wide.

Referring now also to FIG. 2, each processing cell 11 consists of a one-bit gated full adder having on its right hand side co-efficient and carry bit input lines 21 and 22 together with a data bit output line 23. The lines 21, 22 and 23 are connected to the respective right-hand nearest neighbour cell, except for cells on the right hand edge of the array 10, where line 21 is connected to bit-level coefficient input means, carry input line 22 is initialised to zero and data output line 23 is unconnected.

Carry and coefficient output lines 24 and 25 together with a data bit input line 27 are connected to the left hand side of each cell 11 from its left hand nearest neighbour cell. At the left hand edge of the array 10, coefficient output line 25 is unconnected, data bit input line 27 is connected to data input means (not shown) and carry output line 24 is connected to word growth means (not shown). Each cell 11 is connected via cumulative sum input and output lines 28 and 29 to its upper and lower nearest neighbours, except for input lines 28 to top row cells which are initialised to zero, and output lines 29 from bottom row cells which are connected to accumulating means (not shown). The cell input lines 21, 22, 27 and 28 contain respective one-bit storage latches 30, 31, 32 and 33.

On each array processing or clock cycle, coefficient, carry input, data and cumulative sum input bits a, c′, x and s′ are clocked in from latches 30 to 33 respectively (word and bit indices are omitted for convenience). The cell computes the product of bits a and x, adds to it the sum of carry and sum input bits c′ and s′ and generates new carry and cumulative sum bits c and s. The gated full adder logic function is given by:

$$c = (a.x).s' + (a.x).c' + s'.c' \quad (2.1)$$

$$s = s' \oplus (a.x) \oplus c' \quad (2.2)$$

Coefficient and data bits a and x are passed on unchanged to left and right hand neighbouring cells via lines 25 and 23, or out of the array 10 if there is no relevant neighbour. New carry bit c is output via line 24 to the respective left-hand neighbour or word growth means, and new cumulative sum bit s is output via line 29 to the lower neighbour or accumulating means as appropriate. On the next clock cycle, the cell operation repeats.

Referring once more to FIG. 1, the array 10 receives input of data words $x(j)$ ($j=n-i$) from the left and coefficient words $a(i)$ from the right. Each data or coefficient word has blanks or zeros between its respective bits. There are however no blanks between adjacent words, each coefficient or data word following directly after the corresponding preceding word. Coefficient words $a(i)$ progress through the array 10 to the left and data words $x(j)$ to the right, each word moving on by one bit to the next respective cell 11 on each clock cycle.

Coefficient words $a(i)$ are input to the array 10 with most significant bits (msb) $a3(i)$ leading, whereas data words are input lsb $x0(j)$ leading. Coefficient input to adjacent rows takes place with a one-cell time delay or stagger increasing cumulatively down the array 10; i.e. $a3(9)$ in a top row cell leads $a3(8)$ in the next row by one cell and $a3(5)$ in the fifth row by four cells. Coefficients are input to the array 10 repeatedly, each coefficient $a(i)$ being recirculated through a respective row. Because of the cumulative time stagger, the series of blocks of coefficients input to the array 10 may be envisaged as successive leftward leaning parallelograms, e.g. 40, 41, 42, 43 and 44 indicated by chain lines, parallelogram 42 being shown in full and others in part.

The sequence of data words $x(0)$, $x(1)$, $x(2)$ ... is input sequentially to each row of the array 10. Input to each row is delayed by six cells or clock cycles compared to input to the respective row immediately below. The array 10 is shown executing the sixty-sixth cycle of operation, the first cycle being that on which the leading bit $x0(0)$ entered the bottom row. By inspection, it will be noted that data words $x(0)$ to $x(7)$ have passed entirely through the bottom row of the array 10, whereas $x(0)$ has yet to leave the top row.

Although the six-cell time stagger between input of the same data word $x(j)$ to adjacent rows is cumulative in the direction up the array 10, it is equivalent and convenient for analysis purposes to envisage a one-cell time stagger cumulative down the array between successive words $x(j)$ and $x(j+1)$ input to adjacent rows, it being noted that each data word occupies seven cells. On this basis, and by analogy with the coefficient parallelograms 40 to 43, successive illustrated blocks of data words 0 to $x(7)$, 0 to $x(8)$, $x(0)$ to $x(9)$, $x(1)$ to $x(10)$ and $x(2)$ to $x(11)$ are envisaged as occupying successive rightward leaning parallelograms 50, 51, 52, 53 and 54 indicated by dotted lines, parallelogram 52 ($x(0)$ to $x(9)$) being shown in full and others in part.

It will be appreciated that those parts of data or coefficient parallelograms outside the array 10 do not have physical significance, since they do not correspond to cells 11 evaluating products. They are however illustrated to assist understanding of processor operation.

The FIG. 1 prior art convolver array 10 operates as follows. Data and coefficient parallelograms interact within the array 10 in diamond shaped interaction regions such as 60 produced by the interaction of parallelograms 42 and 52. Parallelograms 41 and 51 have nearly completed interaction in part diamond or triangular shaped region 61, and parallelograms 43 and 43 have begun to interact in region 62. Parallelograms 40/50 or 44/54 have finished or have yet to begin interaction respectively.

The interaction regions 60, 61 and 62 contain those cells 11 which are computing bit-level products forming contributions to each convolution product $y(n)$. Convolution terms $y(0)$ to $y(7)$ inclusive have previously been computed and corresponding interaction regions have passed out of the array 10. Regions 60, 61 and 62 are evaluating $y(9)$, $y(8)$ and $y(10)$ respectively. Cells 11 not within regions 60 to 62 produce zero products only, since the effect of interspersing zeros between data or coefficient bits is to ensure that such cells contain a data or coefficient bit and a zero at any instant. As data and coefficient parallelograms mutually counter-propagate through the array 10, the interaction regions 60 to 62 move downwards. Each partial column of cells within an interaction region contributes to a respective bit of the convolution product generated by that region. The extreme right-hand cell 11 within region 60 is shown computing the product of lsbs $a0(4)$ and $x0(5)$, to which it is adding a cumulative sum bit received from the cell above. The cumulative sum bit represents the lsb of the sum of products $a0(90).x0(0)$, $a0(8).x0(1)$, $a0(7).x0(2)$, $a0(6).x0(3)$ and $a0(5).x0(4)$ computed on the preceding five cycles, carry bits having been transferred laterally to respective left hand neighbouring cells. On the four cycles subsequent to that illustrated, products $a0(4).x0(5)$ to $a0(0).x0(9)$ will have been computed and their lsbs added to the cumulative sum. Accordingly, the output of the extreme right hand bottom row cell 11 will, five cycles after that illustrated, provide the lsb of $y(9)$, i.e. $y0(9)$.

The second column of cells from the right similarly provides the second lsb of $y(9)$, $y1(9)$. However, on each cycle three cells 11 contribute to $y1(9)$. On the cycle illustrated $a0(5).x1(4)$ and $a1(3).x0(6)$ are being evaluated by two cells 11, with a third cell computing a zero product. There is also addition of carry bits computed by right hand neighbours a cycle earlier, and higher order carry bits pass to the left. In general, the bit-level contributions to $y(n)$ accumulate vertically and carry bits propagate laterally to the left.

Below the array 10, individual full adders (not shown) are arranged to accumulate bottom row cell outputs as appropriate to generate successive bit-parallel $y(n)$ terms. The accumulator incorporates switching means to adjust bit accumulation from the earlier initial and later final contributions from inner columns of an interaction region as compared to those from outer columns, so that bit-level contributions to successive $y(n)$ terms are accumulated correctly. Word growth of $y(n)$, i.e. propagation of carry bits to the left increasing the word size beyond the array width, is accommodated by half-adder cells (not shown) connected to the left hand side of the array 10, the numbers of half-adder cells adjacent to successive rows increasing logarithmically down the array. The bottom row of cells 11 requires $\log_2 N$ half-adder cells to its left to accommodate growth, N being the number of convolution points, i.e. four half-adder cells after rounding up the logarithm. The accumulating means or full adder cells extend to accumulate half-adder cell outputs, and provision is made to accumulate in appropriate $y(n)$ terms respective carry bits required to propagate across the array 10 and half adder cells on its left hand side. This requires twinning of corresponding full adder accumulator cells and means for switching therebetween. These arrangements are described in detail in the Proceedings of VLSI 83 (Trondheim, Norway, 16–18 Aug. 1983, pp 227–235, North Holland).

As described above, data input to the prior art array 10 is arranged specifically to ensure that bit-level product contributions to each value of y(n) are evaluated within interaction regions such as 60 to 62. This results from zeros being interspersed between adjacent bits but not between adjacent words, and avoids the generation of unwanted bit-level products. However, the effect is that cells 11 outside interaction regions 60 to 62 are idle at any given time, in that they are computing null products, and are brought into play only when interaction regions move to enclose them.

Referring now to FIGS. 3 and 4, in which like parts are like referenced, there is shown a digital data processor of the invention arranged to carry out the ten-point convolution operation of Equation (1) with four bit data and coefficient words. The processor comprises an array 70 of processing cells indicated by squares such as 71 shown in more detail in FIG. 5. Each cell 71 is a gated full adder similar to the cell 11 illustrated in FIG. 2, except that each successive output carry bit c is recirculated via a line 72 having a latch 73, and becomes an input carry bit c' to the same cell 71 on the next cycle. Since carry bits recirculate on each cell 71 rather than propagating to the left as in the prior art array 10, half-adder cells to accommodate word growth of convolution products y(n) are not required. In other respects, cell 71 is identical to cell 11, and performs the same logical operations set out in Equations (2.1) and (2.2).

The array 70 comprises ten rows of cells 71, one row for each point of the convolution, and four columns, one column for each bit of a data or coefficient word. Successive data parallelograms 0 to x(8), x(0) to x(9), x(1) to x(10) and x(2) to x(11) are partially or wholly illustrated within dotted lines, and are indicated at 80, 81, 82 and 83 respectively. Successive coefficient parallelograms a(9) to a(0) are indicated at 84, 85, 86 and 87 within chain lines. Data and coefficient words x(j) and a(i) propagate to the right and left respectively by one cell space per processing or clock cycle. Blanks are interspersed both between adjacent bits and between adjacent words, so that parallelograms are eight cell spaces wide. Data and coefficient words are both input lsb x0(j) or a0(i) leading.

FIGS. 3 and 4 respectively show the array 70 executing the seventy-third and seventy-seventh cycles of convolution computation, the first cycle being that on which the lsb of x(0), x0(0), entered the bottom row of cells 71. FIG. 4 accordingly shows the array 70 four cycles later than FIG. 3.

By analogy with FIG. 1, in FIG. 3 data and coefficient parallelograms 81 and 85 share a common diamond shaped region having parts 88 and 89, of which only part 88 lies within the array 70. Part 88 contains bit-level convolution products ap(i) xq(j) (p,q=0, 1, 2 or 3) not being evaluated because there are no cells 71 at corresponding locations. However, four cycles later in FIG. 4 it is seen that movement of data and coefficient parallelograms has produced a triangular overlap region 90 within the array 70, the region 90 containing identical bit-level convolution products to those of region 89 outside the array 70 four cycles earlier. It may be envisaged for analysis purposes that the diamond shaped interaction region 60 of FIG. 1 has become divided vertically into two parts, and the left hand triangular part has been relocated above, to the right and adjacent to the right hand part. This results in parallelogram shaped interaction regions $91_1$ and $91_2$ (shown in part within broad lines) in FIGS. 3 and 4 respectively, in which regions convolution term y(9) is being computed. The interaction region $91_1$ moves down the array 70 as data and coefficient parallelograms counterpropagate across, and becomes region $91_2$ four cycles later. Similarly region $92_1$ in which y(10) is being computed moves down the array 70 to become $92_2$. Region 93 in FIG. 3, corresponding to y(8), is shown only partly within the array 70 in FIG. 3, and has wholly left the array four cycles later in FIG. 4. Regions corresponding to y(0) to y(7) have passed through the array 70 in FIGS. 3 and 4, and regions corresponding to y(11) onwards have yet to enter it.

Each interaction region 91, 92 or 93 contains all the bit-level partial products necessary to produce a respective convolution term y(9), y(10) or y(8). Accordingly, despite having fewer cells than the prior art array 10, the array 70 of the invention still performs an equivalent operation. In effect, the array 70 employs cells 71 corresponding to redundant prior art cells 11 which computed products of zeros and data bits. This may be appreciated by comparing the upper right portion of region $91_1$ with the region above and to the right of interaction region 60 in FIG. 1. Accordingly the array 70 of the invention incorporates reduced redundancy as compared to the prior art array 70.

The reduced cell redundancy of the array 70 arises from the differences in data and coefficient input and timing as compared to the prior art array 10. As has been said, both data and coefficient words are input lsb leading with blanks interspersed between both bits and words. In the prior art device coefficient words were input msb leading, and adjacent coefficient or data words were not separated by blanks. These differences produce the following effects. The prior art array 10 produces a bit-parallel output, bit-level contributions to each convolution term being arranged vertically up the array 10. However, array 70 of the invention provides bit-serial outputs, with individual contributions to each bit of a convolution term y(n) being arranged horizontally across the array within an interaction region. The Equation (1) word-level summation of contributions to each y(n) term may be expressed as a bit-level double summation providing individual bits of y(n); i.e. the rth bit yr(n) is given by:

$$yr(n) = \sum_{i=0}^{N-1} \sum_{k=0}^{r} ak(i)x [r - k](n - i) + \quad (3)$$

carry bit from $(r - 1)$th bit computation

For example, it can be seen that the fourth least significant bit of y(9), i.e. y3(9), has four bit-level product contributions in the same horizontal line in regions 88 and 89 in FIG. 3. Of these, contributions a2(3) x1(6) and a3(3) x0(6) are being evaluated as shown in region 88, and contributions a0(3) x3(6) and a1(3) x2(6) within region 89 will be evaluated four cycles later within the array 70 as shown in FIG. 4. In order to compute each bit of y(n), it is necessary during accumulation of bits to apply a four cycle delay to the lower left triangular portion of each interaction region 91 to realign in time bit-level products of equivalent bit significance. This is carried out within accumulating means to be described later.

As has been mentioned, in the prior art carry bits propagate to the left to be accommodated in word-growth half adder cells when they have passed out of the array 10. In the array 70 of the invenrtion, carry bits recirculate on each cell 71 as interaction regions 91 move downwards. In effect, carry bits propagate up respective interaction regions. It is necessary that carry bits remain within their respective interaction regions. This requires a carry bit to have become zero by the time that the next interaction region has moved down to encompass the relevant cell 71. By inspection of FIG. 3, it is seen that the maximum number of bits in each coefficient y(n) is eight if carry bits are not to propagate from interaction region $91_1$ to $92_1$. This eight bit limit arises from the maximum number of eight cells of a column encompassed by an interaction region. In FIG. 3, eight cells 71 of the left hand column of the array are contained by region $91_1$. For the purposes of illustrating operation of the array 70 in drawings of comparatively reasonable scale, and to facilitate explanation and prior art comparison, it was assumed that the sum of bit-level partial products in Equation (3) would generate eight-bit y(n) values for a(i) and x(j) of four bits. This is not generally the case, since a product of four-bit numbers produces an eight bit number and a sum of four-bit products may produce numbers larger than eight bits. In general, a sum of k products of two numbers each m bits wide produces a number having $2m+\log_2 k$ bits. Thus, in the example illustrated in FIGS. 3 and 4, y(n) having eight bits corresponds to $8=2m+\log_2 k$. This is turn corresponds to a(i) and x(j) originally having m bits but extended with zeros to $m+\frac{1}{2}\log_e k$ bits to accommodate word growth of the convolution terms; i.e. $m+\frac{1}{2}\log_2 k=4$, since a(i) and x(j) were treated as four bit numbers. Now $k=N$, the number of points in the convolution, so $k=10$ and $\frac{1}{2}\log_2 10=2$ upon rounding up. Accordingly, if $m+\frac{1}{2}\log_2 k=4$, $m=2$. The array 70 therefore is capable of dealing with values of a(i) and x(j) which are two bits wide but which are extended with zero bits to four bits.

To provide an N point convolution of two m-bit numbers, the prior art array 10 requires $2m-1$ columns of gated full adder cells 11 together with up to $\log_2 N$ i.e. four half-adder cells alongside each row to accommodate word growth. The array 70 of the invention requires $m+\frac{1}{2}\log_2 N$ columns to execute the same convolution, but without any half-adder cells. For small values of m, the difference between the two approaches is not very great. For a(i) and x(j) four bits wide, the prior art would require seven columns as illustrated in FIG. 1 plus up to four half-adders, whereas an array of the invention would require six columns without half-adders. The benefits of the invention become more appreciable when larger word lengths are employed. For a ten-point convolution of sixteen bit data and coefficient words, the prior art array would have thirty-one columns, whereas an array of the invention would have only eighteen.

Referring now to FIG. 6, there is shown an alternative form of cell 100 appropriate for processing twos complement numbers. The cell 100 is equivalent to cell 71 of FIG. 5 with the addition of a vertical input control line 101 incorporating a latch 102 together with a vertical output control line 103.

The cell 100 modifies the array (20 or 70) to handle twos complement words in accordance with the Baugh Woolley algorithm, IEEE Trans. on Computers, Vol C-22, No 12, December 1973 pp 1045-1047. The multiplication of two twos complement words may be transformed into all positive partial products, provided that all negatively weighted partial products (those involving multiplication of a sign bit by a non-sign bit) are complemented and a fixed correction term is added to the final answer. If the numbers to be multiplied are m bits wide, the correction term has the value $2^m - 2^{2m-1}$. A detailed analysis based on FIG. 1 would indicate that the partial products to be complemented are those falling on the upper left and right boundaries—but not the apex—of the diamond shaped interaction regions when present in the array 10, and corresponding products in the parallelogram shaped interaction regions of FIGS. 3 and 4. It will be appreciated that equivalent products must be complemented as they move in the array 70. The partial products to be complemented are identified by means of the control function of the cell 100. An additional control bit is latched at 102 for input to the cell 100, the control bit being set to 1 when the complement of the partial product a.b is to be added to the cumulative input sum s' to form the cell output s. The control bit is latched from cell to cell vertically down the array 70 in synchronism with the propagation of the edges of interaction regions, and is used to indicate cells at which complementing is required.

The logic function of the cell 100 is as follows, where ctrl indicates the control bit and other terms are as previously defined:

$$s = s' \oplus (\text{ctrl} \oplus a.b.) \oplus c' \quad (4.1)$$

$$c = (\text{ctrl} \oplus a.b).s' + (\text{ctrl} \oplus a.b).c' + s'.c' \quad (4.2)$$

As has been mentioned, the final results of the array computations are required to be corrected for the presence of unwanted sign/non-sign cross-product terms. If the resultant value y(n) in Equation (3) emergent from the array 70 is the result of k additions of bit-level multiplications, the correction term is $k \, x(2^m - 2^{2m-1})$ for m-bit words. Correction may be achieved quite simply either by initialising the cumulative product inputs of top row processing cells, or by adding corrections to the output of the accumulating means to be described.

One form of handling twos complement numbers has been described in detail in published United Kingdom Patent Application No. GB 2106 287 A, The above form is expected to be published shortly in the IEEE Trans. Circuits and Systems under the authorship of McWhirter, Wood, Wood, Evans and McCabe.

Referring now to FIGS. 7 and 8, there is shown an accumulator indicated generally by 110 appropriate for the array 70 of FIGS. 3 and 4. The accumulator 110 has individual cells 111 which are one bit full adders. Each adder 111 has two input lines 112 incorporating respective latches 113, a carry recirculation line 114 including a latch 115, and an output line 116. On each clock cycle, each adder 111 receives two input data bits p' and q' on input lines 112, adds them to a carry bit c' from a computation one cycle earlier, and produces a sum bit s on output line 116 and a new carry bit c on recirculation line 114. The full adder logic function is given by:

$$s \leftarrow p' \oplus q' \oplus c' \quad (5.1)$$

$$c \leftarrow p'.q' + p'.c' + q'.c' \quad (5.2)$$

The accumulator 110 has six adders 111 arranged in upper, middle and lower ranks indicated by chain lines 117, 118 and 119 and containing three, two and one of the adders 111 respectively. The input lines 112 of adders $111_1$ to $111_3$ in the upper rank 117 are connected to sum outputs of the four bottom row cells $71_1$ to $71_4$ of the array 70 via four two-way switches indicated schematically by $120_1$ to $120_4$. Each adder $111_4$ or $111_5$ of the middle rank 118 is connected directly to a respective outer upper rank adder $111_1$ or $111_3$ and indirectly via a two-way switch 121 to the central upper rank adder $111_2$. The left-hand middle rank adder $111_4$ is connected via a four-bit shift register 122 to the lower rank adder $111_6$, to which the right-hand middle rank adder $111_5$ is connected directly.

The accumulator 110 operates under the action of the clocking means (not shown) employed to control the array 70, each rank of adder 111 operating on each clock cycle. Outputs from cells $71_1$ to $71_4$ accordingly emerge from lower rank adder $111_6$ three cycles later. The positions of the switches $120_1$ to $120_4$ determine the routeing of outputs from cells 71 to upper rank adders $111_1$ to $111_3$, as shown in Table 1 where L or R indicates a left or right switch position.

TABLE 1

| Cell | Switch | Position | Adder |
|---|---|---|---|
| $71_1$ | $120_1$ | L | $111_1$ |
| | | R | $111_2$ |
| $71_2$ | $120_2$ | L | $111_1$ |
| | | R | $111_2$ |
| $71_3$ | $120_3$ | L | $111_2$ |
| | | R | $111_3$ |
| $71_4$ | $120_4$ | L | $111_2$ |
| | | R | $111_3$ |

Similarly, the output of upper rank adder $111_2$ is routed to middle rank adder $111_4$ or $111_5$ according to whether switch 121 is positioned to the left or right. If all four switches 120 and switch 121 are positioned to the left, middle rank adder $111_4$ receives the outputs of all four bottom row cells 71. The output of adder $111_4$ is delayed by four clock cycles by the shift register 112 before reaching the lower rank adder $111_6$. If all four switches 120 and switch 121 are positioned to the right, middle rank adder $111_5$ receives all four cell outputs which pass to lower rank adder $111_6$ without intervening delay. If some of switches 120 are positioned to the left and others to the right, cell outputs are divided between the delayed route and the non-delayed route before being recombined by adder $111_6$ to provide a bit-serial output lsb leading for successive convolution terms.

In order to realign in time bit-level contributions to successive convolution terms, the switching sequence given in Table 2 below is carried out cyclically. The sequence repeats every eight clock cycles, in accordance with the maximum number of eight bits in each convolution term. Switch 121 changes its position from left to right or right to left whenever, on the previous cycle, a majority of the switches 120 have become positioned to the right or left respectively, switch 121 receiving data bits which passed through switches 120 one cycle earlier.

TABLE 2

| Clock Cycle | Switch Position Switch | | | | |
|---|---|---|---|---|---|
| | $120_1$ | $120_2$ | $120_3$ | $120_4$ | 121 |
| W + 1 | L | R | R | R | R |
| W + 2 | L | L | R | R | R |
| W + 3 | L | L | L | R | R |
| W + 4 | L | L | L | L | L |
| W + 5 | L | L | L | L | L |
| W + 6 | L | L | L | R | L |
| W + 7 | L | L | R | R | L |
| W + 8 | L | R | R | R | L |

TABLE 2-continued

| Clock Cycle | Switch Position Switch | | | | |
|---|---|---|---|---|---|
| | $120_1$ | $120_2$ | $120_3$ | $120_4$ | 121 |
| W + 9 | L | R | R | R | R |

The Table 2 switching sequence relationship to the cycle illustrated in FIG. 3 is given by setting the cycle basis integer W to 73, i.e. Table 2 gives the accumulator switching sequence for the next nine cycles after that shown in FIG. 3.

In practice, the switches 120 and 121 would be implemented by transistors operated by switching waveforms. In practice, an adder $111_1$ to $111_5$ having one or both unconnected inputs would be arranged to receive one or two zero inputs as appropriate. Provision of appropriate circuitry and waveforms is well understood in the art of digital electronics and will not be described further.

By inspection of FIGS. 3 and 4, it will be appreciated that at any given time half of the cells 71 are not evaluating bit-level products. This is a consequence of interspersing with spaces or zeros the bits of data and coefficient words. The corresponding cell redundancy is capable of further reduction.

Referring now to FIGS. 9 and 10, there is shown a further processor array 130 of the invention arranged to carry out the convolution operation of Equation (1) and illustrated on two successive cycles of operation, the seventy-second and seventy-third respectively. The array 130 incorporates twenty gated full adder cells such as 131 and as illustrated in FIG. 5 or 6. The cells 131 are arranged in two columns indicated by chain lines 132 and 133 and ten rows indicated by chain lines 135 to 144 inclusive, one row for each point of the convolution.

Data and coefficient input is arranged so that there are no zeros or spaces between either bits of a word or successive words. This has the effect that all cells 131 are evaluating bit level products on every clock cycle. In FIG. 9, five successive data regions $145_1$ to $149_1$ (dotted lines) are shown moving to the right, together with four coefficient regions $150_1$ to $153_1$ (chain lines) moving to the left. Data regions $146_1$, $147_1$ and $148_1$ are in the process of interaction with successive coefficient regions $151_1$ and $152_1$ to define interaction regions $154_1$, $155_1$ and $156_1$ (broad lines) evaluating y(8), y(9) and y(10) respectively. The data, coefficient and interaction regions became $145_2$ to $156_2$ respectively one cycle later in FIG. 10. Regions $147_1/147_2$, $151_1/151_2$ and $155_2$ are shown in full and others in part. The effect of contraction to remove interspersed zeros may be inferred from the multilateral shapes of the regions $145_1$ and $145_2$ to $156_1$ and $156_2$ inclusive. In particular, data or coefficient regions have zig-zag diagonal sides and interaction regions become two linked elongate rectangles in this example. By analogy with parallelogram interaction region $91_1/91_2$ in FIGS. 3 and 4, interaction region $155_1/155_2$ has two component regions $157_1/157_2$ and $158_1/158_2$ to be realigned in time by accumulating means to be described.

To compensate for the lack of interspersed zeros, the movement of data and coefficient words through the array is more complex than in FIGS. 1, 3 and 4, where both types of word move through one cell on every cycle. In the present case, on even numbered cycles, data words x(j) in odd numbered rows 135, 137 . . . and coefficient words a(i) in even numbered rows 136, 138 ... move one cell to the right and left respectively. Data and coefficient words in even and odd numbered rows respectively remain stationary. On odd numbered cycles, data and coefficient words in respective even and odd numbered rows move one cell to the right and left respectively, and those in respective odd and even numbered rows remain stationary. There is a one cell or cycle cumulative time stagger between input of coefficients or data words to alternate rows 135, 137 ... or 136, 138 .... However, as regards data or coefficient words in any adjacent pair of rows, the upper word moves to establish a one cell time stagger over the lower on alternate cycles, and this stagger is removed on each subsequent cycle by movement of the lower. In FIG. 9, a(9) is in phase with a(8) and x(0) leads x(1) by one cycle. Comparing FIG. 10, a(9) and x(1) have moved while a(8) and x(0) remained stationary, such that a(9) now leads a(8) but x(0) has become in phase with x(1). This pattern of movement is repeated for adjacent pairs of rows down the array 130. The effect is achieved by clocking each cell's data and coefficient bit input latches on respective alternate clock cycles, whereas crtl, carry and sum bit input latches are clocked every cycle. Each of the cells 131 now evaluates bit-level products on every clock cycle.

Referring now also to FIG. 11, there is shown an accumulator 160 for accumulating bit-level contributions to convolution terms y(n), and for generating successive values of y(n) bit serially lsb leading. Cells 131, and 131₂ in the bottom array row 144 are connected to respective two-way switches 161₁ and 161₂, and thence to either of two full adders 162₁ or 162₂ in accordance with switch position. The adders 162 are as shown in FIG. 8. A third adder 162₃ receives the output of adder 162₁ via a four-bit shift register 163 giving a four cycle delay, but receives the output of adder 162₂ directly.

TABLE 3

| Clock Cycle | Switch Position Switch | |
|---|---|---|
| | $161_1$ | $161_2$ |
| W + 1 | L | R |
| W + 2 | L | R |
| W + 3 | L | L |
| W + 4 | L | L |
| W + 5 | L | L |
| W + 6 | L | R |
| W + 7 | L | R |
| W + 8 | R | R |
| W + 9 | L | R |

Table 3 sets out the switching pattern of switches 161₁ and 161₂ on nine successive clock cycles, the pattern repeating every eight cycles. This pattern operates to realign in time components of interaction regions such as components 152 and 153 in FIGS. 9 and 10. Operation is analogous to that described with reference to FIG. 7. The switching pattern corresponds to that shown in FIG. 9 or 10 with the cycle basis number W set equal to seventy-three, i.e. cycle W+1 is equivalent to two cycles later than the seventy-second cycle illustrated in FIG. 9.

The example of the invention described with reference to FIGS. 9 to 11 operates equivalently to that described with reference to FIGS. 3 to 9. It employs two columns of ten cells 131 to compute a convolution of two bit data and coefficient words extended with zeros to four bits to accommodate word growth. For an N-point convolution of m bit words, it would require $\frac{1}{2}(m+\frac{1}{2} \log_2 N)$ columns. For a ten point convolution of sixteen bit words, it would require nine columns as opposed to thirty-one for the prior art and eighteen for a processor corresponding to the earlier example of the invention.

To demonstrate that the FIGS. 9 to 11 embodiment of the invention collects bit-level contributions in the appropriate manner, consider the lowermost or tenth cell 131 (row 144, column 132) within interaction region 158₂ in FIG. 10 and corresponding to y(9). That cell is computing the product of a0(0) and x0(9), and adding a cumulative input sum bit s' equal to the lsb of the sum of lsb products calculated on the previous nine cycles. The expression for input bit s' includes nine terms (i=1 to 9) as follows:

$$s' = lsb \text{ of } \sum_{i=1}^{9} a0(i) \, x0(9-i) \tag{6}$$

On the next cycle, the output of the cell 131 will be given by output bit s incorporating ten terms (i=0 to 9) as follows:

$$s = lsb \text{ of } \sum_{i=0}^{9} a0(i) \, x0(9-i) = y0(9) \tag{7}$$

Of the various bit-level contributions to the summations in Equations (6) and (7), a0(9) x0(0) was evaluated in the top left hand cell 131 (row 135, column 132) nine cycles earlier than that illustrated in FIG. 10, a0(8) x0(1) eight cycles earlier in the second left hand cell 131 (row 136, column 132) and so on. Carry bits have recirculated on respective cells after every product computation, so that higher order carry bits arising out of the Equation (7) summation have propagated up the interaction region 155₂ as it moves down. The sum bit s will emerge from the FIG. 11 accumulator six cycles after that illustrated in FIG. 10 because of the four cycle delay applied by the shift register 163.

Two cycles after that shown in FIG. 10, a sum bit s will emerge from the left-hand bottom row cell 131, s being given by:

$$s = \sum_{i=0}^{9} a1(i) \, x0(9-i) + \text{first order carry bit from Equation (7)} \tag{8}$$

Six cycles after that illustrated in FIG. 10, a sum bit s will emerge from the right-hand bottom row cell 131, s being given by:

$$s = \sum_{i=0}^{9} a0(i) \, x1(9-i) \tag{9}$$

The shift register 163 applies a four cycle delay so that the Equation (8) and (9) expressions are added to form the second lsb of y(9), i.e. y1(9).

$$y1(9) = \sum_{i=0}^{9} [a1(i) \, x0(9-i) + a0(i) \, x1(9-i)] + \text{carry bit} \tag{10}$$

$$\text{i.e. } y1(9) = \sum_{k=0}^{1} \sum_{i=0}^{9} ak(i) \, x[1-k](9-i) + \text{carry bit} \tag{11}$$

Similar expressions are subsequently produced for higher order bits, ie yr(9) with r=2 and 3 (Equation (3) refers). However, a(i) and x(n−i) have been extended with zeros from two to four bits to accommodate word growth of y(n) as previously described. Accordingly, the fifth to eighth bits of each value of y(n), i.e. y4(n) to y7(n), will consist only of carry bits from respective lower order summations.

Referring now to FIG. 12, there is shown a more detailed version of three successive rows 138 to 140 of the array 130 of FIGS. 9 and 10. There are shown six gated full adder cells 171 to 176, each equivalent to that shown in FIG. 6. Each cell 171 to 176 respectively has a ctrl input latch $171_1$ to $176_1$, a cumulative sum (c') input latch $171_2$ to $176_2$, a carry latch $171_3$ to $176_3$ in a recirculation line $171_4$ to $176_4$, and data (x) and coefficient (a) input latches $171_5$ to $176_5$ and $171_6$ to $176_6$ respectively. The data input latch $171_5$, $173_5$ or $175_5$ of each left hand cell is connected by a respective feed line $177_1$, $177_2$ or $177_3$ to the data output line $174_7$, $176_7$ or not shown of the right hand cell in the respective row below. The data feed lines $177_1$ to $177_3$ incorporate respective pairs of latches $173_8/174_8$, $175_8/176_8$, or not shown, each latch being associated with a respective cell. The coefficient input latch $172_6$, $174_6$ or $176_6$ of each right hand cell is connected by a respective feedback line $179_1$, $179_2$ or $179_3$ to the coefficient output $171_9$, $173_9$ or $175_9$ of a respective left hand cell in the same row. Each coefficient feedback line $179_1$ to $179_3$ incorporates respective pairs of latches $171_{10}/172_{10}$ to $175_{10}/176_{10}$, each latch being associated with a respective cell.

The rows $170_1$ to $170_3$ of cells 171 to 176 operate as follows. Referring now also to FIGS. 9 and 10 once more, it is noted that each coefficient word a(i) passes repeatedly through a respective row. This effect is achieved in the FIG. 12 by feeding back each a(i) from left hand coefficient outputs $171_8$, $173_8$ or $175_8$ to right hand coefficient input latches $172_6$, $174_6$ or $176_6$ via two latches 180 in each case. The number of cells 171 etc in each row 138 to 140 plus the number of feedback latches $171_{10}$ etc between rows is equal to the coefficient word length to ensure that coefficients recycle without gaps or overlap.

Referring now also to FIG. 3 once more, it is noted that data words x(j) are input in such a way that a bit passing out of each row of the array 70 is required two cycles later to enter the respective row immediately above. In particular, the three leading bits of x(8) have passed out of the bottom row and x0(8) has entered the penultimate row. Data words may accordingly be considered to spiral up the array 70. This feature is incorporated in the FIG. 12 arrangement by means of data feed lines 177. The data feed latches $171_8$ etc ensure that data words move up from row to row without gaps or overlap, as with coefficient words the number of cells per row and number of latches between rows being equal to the data word length. This data input arrangement is particularly convenient, since it requires data input only to the left hand bottom row cell of an array. Data words subsequently pass across successive rows before passing out of the top row right hand cell.

In order to load successive rows with appropriate respective coefficient words, it is convenient to incorporate a respective two-way loading switch (not shown) in each coefficient feedback line 179. In one position, the switches close the feedback lines so that the circuit is equivalent to that shown in FIG. 12. In the other position, to load coefficients the loading switches connect each left hand cell coefficient output such as $175_8$ to the carry feedback line 179 of the respective row of cells immediately above. While the loading switches are in the load position, the coefficient words are input sequentially in reverse order to the bottom row right hand cell of the array 130. They then propagate up successive rows, in an analogous fashion to data input previously described, until each row is loaded with the appropriate coefficient. The loading switches are then reset to the normal position equivalent to FIG. 12, and data input then proceeds.

Referring now to FIGS. 13 and 14, there is shown an individual cell 180 of the kind incorporated in FIGS. 9, 10 and 12 and having the logic functions set out in Equations (4.1) and (4.2). The cell 180 has carry, control and cumulative sum bit input latches 181, 182 and 183 indicated by solid squares. Data input and feed latches 184 and 185 are indicated by open squares, and coefficient input and feedback latches 186 and 187 are indicated by crossed squares. The latches are as illustrated in FIG. 14, and comprise first and second half latches 190 and 191 each including a clocked switch or transistor 192 or 193 having a clock input 194 or 195. Each half latch is in series with a respective inverter 196 or 197.

Referring now also to FIG. 15, there are shown four clock waveforms 200 to 203 in mutual antiphase pairs 200/201 and 202/203. Waveforms 202/203 have half the frequency of waveforms 200/201. Each of the carry, control and sum bit input latches 181, 182 and 183 (solid squares) has a first half latch 190 clocked by waveform 201 and a second half latch 191 clocked in antiphase by waveform 200. Data input and feed latches 184 and 185 (open squares) have first half latches 190 clocked by waveform 203 and second half latches 191 clocked by waveform 202 in antiphase. Coefficient input and feedback latches 186 and 187 (crossed squares) have first half latches 190 clocked by waveform 202 and second half latches 191 clocked by waveform 203. Each latch inputs a data bit when its first half latch 190 is clocked and outputs a data bit when its second half latch 191 is clocked. Data input and feed latches are accordingly clocked in antiphase with coefficient input and feedback latches, and both are clocked at half the rate of carry, control and sum input latches.

Clocking of odd numbered rows of cells in FIGS. 9, 10 and 12 is similar except that the data and coefficient latches 184 to 187 receive reversed phase clocking signals, so that they are clocked in antiphase with the cells in even numbered rows as previously described. The circuit of FIG. 12 incorporates a minor degree of redundancy to achieve an array of like cells. A detailed analysis would show that half of one of latches $171_5/173_8$ is redundant with the clocking arrangements described, with similar redundancy applying to other equivalent latch pairs.

Referring now to FIG. 16, there is shown a schematic word-level representation (not to scale) of the convolution operation of FIG. 3 or 4. Successive data word parallelograms 210 to 213 incorporating x(0) ... x(9) to x(3) ... x(12) respectively move to the right as indicated by arrow 214. Successive a(9) ... a(0) coefficient word parallelograms 215 to 217 move to the left as indicated by arrow 219, and interaction takes place in an array indicated by a rectangle 220. N.B. Data words x(0) to x(8), which have passed through the bottom array row 221, are omitted for clarity, with corresponding omissions up the array (cf analysis of FIG. 1). The parallelograms 210 to 213 and 215 to 217 may be further contracted to form multilaterals in accordance with FIGS. 9 and 10, but are shown as parallelograms for clarity.

Referring now to FIG. 17, there is shown a schematic word-level representation (not to scale) of a correlation operation performed by the invention, parts equivalent to those shown in FIG. 16 being like-referenced with a prime superscript. It can be seen that correlation is similar to convolution, but coefficient parallelograms 215′ to 217′ contain coefficients in reversed vertical order, i.e. a(0) to a(9) instead of a(9) to a(0) as before.

Figure 18:
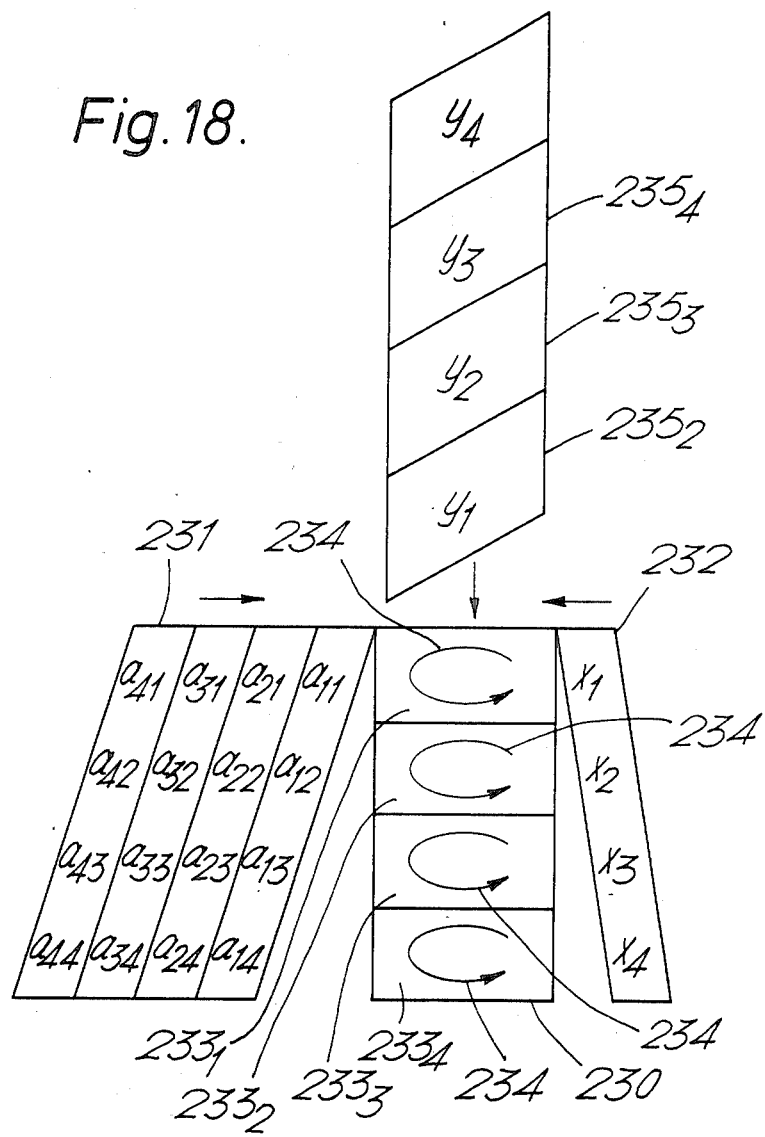

Referring now to FIG. 18, there is shown a schematic word-level representation (not to scale) of a matrix-vector multiplier array 230 in accordance with the invention. The multiplier array 230 is arranged to evaluate the vector y formed by multiplying a vector x by a 4×4 matrix A having coefficients $a_{11} \ldots a_{44}$ indicated within parallelogram 231.

$$\text{i.e. } y = Ax \tag{12}$$

The vector x has coefficients $x_1$ to $x_4$ indicated within parallelogram 232, and the product vector y has coefficients $y_1$ to $y_4$. Interaction of matrix A and vector x is shown about to take place within the multiplier array 230, each coefficient $x_n$ recirculating through a respective nth array row $233_n$ (n=1 to 4) as indicated by arrows 234. Rows $a_{1n}$ to $a_{4n}$ (n=1 to 4) of A are input bit serially lsb leading to respective row $231_n$ of the array 230. Unlike the convolver, elements of the matrix A pass straight through the array 230, rather than spiralling upwards.

As the matrix A propagates across the array 230, successive values $y_1$ to $y_4$ of the product matrix y are formed in successive parallelograms $235_1$ to $235_4$. The parallelograms 235 pass down the array 230 for accumulation in a manner analogous to that in which convolution terms were formed and accumulated as described with reference to FIGS. 3 and 4.

A matrix-matrix multiplication may be treated as a number of individual matrix-vector multiplications. Referring now to FIG. 19, there is shown an array 240 consisting of four sub-arrays $241_1$ to $241_4$ disposed horizontally and each equivalent to the array 230 of FIG. 1. The array 240 provides for matrix-matrix multiplication in accordance with the invention. Two 4×4 matrices A and B having coefficients $a_{ij}$ and $b_{ij}$ are shown interacting to form a product matrix C having coefficients $c_{ij}$ (i, j=1, 2, 3 or 4). C and its coefficients $c_{ij}$ are given by:

$$C = AB \tag{13}$$

$$\text{and } c_{ij} = \sum_{k=1}^{4} a_{ik} b_{kj} \quad i, j = 1 \text{ to } 4 \tag{14}$$

The columns of matrix A, $a_{k1}$ to $a_{k4}$, are input to the array 240 in sequence as indicated within data parallelograms $242_1$ to $242_4$ (dotted lines). These columns progress to the right through successive sub-arrays $241_1$ to $241_4$, each row of A passing through respective sub-array rows. Each element of B, $b_{ik}$, recirculates as indicated by arrows such as 243 on a respective row of a respective sub-array. Each row of B occupies a respective sub-array, e.g. row $b_{1k}$ occupies sub-array $241_1$. Coefficients of C, $c_{ij}$, are formed within downward moving parallelograms shaped interaction regions such as $c_{14}$ within parallelogram 244. For illustrational purposes coefficients $c_{ij}$ are shown above and below the array 240, i.e before and after computation. As has been mentioned, however, only those interaction regions within the array 240 have physical significance.

Coefficients of C emerge bit-serially lsb leading from the array 240, each column of C being computed by a respective sub-array 241.

For presentational clarity, FIGS. 16 to 19 are drawn in terms of input and interaction regions shaped as parallelograms in accordance with FIGS. 3 and 4. Alternatively, by employing the alternating input clocking arrangements described with reference to FIGS. 9 to 15, the input and interaction regions become multilaterals as shown in FIGS. 9 and 10.

The examples of FIGS. 16 to 19 were described in terms of a ten-point convolution or correlation, a four element vector and four by four matrices. The arrays 220, 230 and 240 may be extended vertically with larger numbers of cells to accommodate further convolution, correlation or product terms. This may be achieved by increasing the number of cells per array or by cascading individual circuits having fixed numbers of cells. In addition, the array 240 may be extended horizontally to accommodate larger input word sizes and/or matrices by adding sub-arrays 241. This makes it possible to provide an individual multi-purpose integrated circuit or chip suitable for convolution, correlation and matrix-vector or matrix-matrix multiplication, the chip being cascadable vertically and horizontally to accommodate the relevant application. The chip would have programmable switches for loading recirculating coefficients and for either upward spiral throughput of convolution or correlation data or linear throughput of matrix elements. Such a chip could easily be constructed in a similar manner to that described with reference to FIG. 12.

We claim:

1. A digital data processor for carrying out a multiplication operation involving a stream of data words and a set of coefficient words to form output terms, each consisting of a sum of data/coefficient products, comprising:

(1) an array of bit-level logic cells arranged in rows and columns;
   (2) each logic cell is arranged to:
      (a) input data, coefficient, carry and cumulative sum bits,
      (b) compute output cumulative sum and carry bits corresponding to addition of the input cumulative sum and carry bits to the product of the input data and coefficient bits, each cumulative sum bit being a contribution to a respective bit of an output term,
      (c) output the data, coefficient and output cumulative sum bits, and
      (d) recirculate the output carry bit via a clock-activated carry latch to provide the respective cell with an input carry bit for a succeeding computation;
   wherein each array row has a data input and a coefficient input at mutually opposite row ends for input of data and coefficient words bit-serially with least significant bits leading, each coefficient word being associated with a respective row;
   wherein each pair of row neighbour cells is interconnected via a respective data line and coefficient line and each pair of column neighbour cells is interconnected via a respective cumulative sum line, and (3) a respective clock-activated latch provided on each said line for bit storage and advance for data and coefficient bit movement in counterflow along array rows and cumulative sum bit movement down array columns; said clock-activated latches providing delays appropriate to time movement of carry, data, coefficient and cumulative sum bits such that in operation of the array each cell computes contributions to output terms in ascending order of bit significance and cumulative sum generation is cascaded down array columns to yield sums of contributions to respective output term bits; and (4) accumulating means coupled to cumulative sum outputs of final cells of said array columns, for adding said outputs together, the accumulating means incorporating bypassable delaying means arranged to counteract relative delay between array output of sums of contributions to each output term bit.

2. A digital data processor according to claim 1 wherein each array row has a respective coefficient output at a row end opposite to that of its said coefficient input, and further comprising clock-activated delaying means connected between the respective coefficient output and the respective coefficient input for recirculating the respective coefficient repetitively through the row.

3. A digital data processor according to claim 2 wherein the multiplication operation is one of a convolution and correlation operation, and wherein each row other than that uppermost row has a data output connected via a respective data feed line to a data input of a respective row immediately above it, the data feed lines including clock-activated delaying means arranged to relay data words from row to row up the array.

4. A digital data processor according to claim 1 wherein the accumulating means includes an adder tree comprising three full adder logic cells, arranged in successive cell ranks to add all sums of contributions to each output term bit, said delaying means being arranged to delay one input to a final rank full adder logic cell of the tree and said accumulating means including switchable adder inputs arranged to route added sums of contributions to respective output term bits by one of: (1) through the delaying means, and (2) around said delaying means an appropriate to synchronise arrival of added sums of contributions to each output term bit at the said final rank full adder cell.

5. A digital data processor according to claim 1 wherein each said clock-activated latch includes two half latches in series arranged for clocking in antiphase, and including clocking means for generating two antiphase pairs of signals, one pair having twice the frequency of the other, the clocking means for:

(1) activating carry and cumulative sum line latches with the higher frequency pair of signals and data and coefficient line latches with the lower frequency pair of signals, and (2) activating data line latches in each row in antiphase both with coefficient line latches in that row and with adjacent row data line latches.

6. A digital data processor according to claim 1 wherein the multiplication operation is matrix-vector multiplication, each data word is a matrix element and each coefficient is a vector element, and wherein the processor includes data input means arranged to input each matrix row word serially into a respective row of the array.

7. A digital data processor according to claim 1 wherein each array row has a respective data output at a row end opposite to that of its data input, and wherein the data inputs are connectable to corresponding data outputs of a second like processor and the data outputs are connectable to corresponding data inputs of a third like processor as appropriate to enable the processor to form part of an array of like processors.

8. A digital data processor according to claim 7 wherein each array row has a respective coefficient output at a row end opposite to that of its said coefficient input, and further comprising clock-activated delaying means between the respective coefficient output and the respective coefficient input, for circulating the respective coefficient through the corresponding row.

* * * * *